United States Patent
Heo et al.

(10) Patent No.: US 8,743,509 B1
(45) Date of Patent: Jun. 3, 2014

(54) DISK DRIVE HAVING A HEAD LOADING RAMP AND A DISK LIMITER TAB THAT PROJECTS FROM A SIDE OF AN ACTUATOR ARM

(75) Inventors: Baekho Heo, San Jose, CA (US); Enoch Mylabathula, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 171 days.

(21) Appl. No.: 12/777,152

(22) Filed: May 10, 2010

(51) Int. Cl.
*G11B 5/54* (2006.01)
*G11B 21/22* (2006.01)

(52) U.S. Cl.
USPC ............... 360/254.8; 360/254.6; 360/265.1

(58) Field of Classification Search
USPC ............ 360/255, 254.6, 265.1, 254.8, 265.9, 360/266
See application file for complete search history.

(56) References Cited

U.S. PATENT DOCUMENTS

| | | | |
|---|---|---|---|
| 4,939,611 A | | 7/1990 | Connolly |
| 5,231,549 A | * | 7/1993 | Morehouse et al. ............ 360/75 |
| 5,239,431 A | | 8/1993 | Day et al. |
| 5,453,889 A | | 9/1995 | Alt |
| 5,541,791 A | * | 7/1996 | Yamasaki et al. .......... 360/256.1 |
| 5,625,514 A | * | 4/1997 | Kubo et al. ................ 360/254.8 |
| 5,640,290 A | | 6/1997 | Khanna et al. |
| 5,757,587 A | | 5/1998 | Berg et al. |
| 5,801,899 A | | 9/1998 | Genheimer |
| 5,864,444 A | * | 1/1999 | Baker et al. ................ 360/265.9 |
| 5,903,409 A | * | 5/1999 | Allen et al. ...................... 360/75 |
| 5,959,807 A | * | 9/1999 | Jurgenson .................. 360/245.7 |
| 6,055,134 A | | 4/2000 | Boutaghou |
| 6,084,744 A | | 7/2000 | Genheimer et al. |
| 6,115,214 A | | 9/2000 | Allsup et al. |
| 6,137,658 A | | 10/2000 | Matsuzaki et al. |
| 6,172,843 B1 | | 1/2001 | Genheimer et al. |
| 6,208,484 B1 | | 3/2001 | Voights |
| 6,215,628 B1 | | 4/2001 | Boutaghou |
| 6,226,144 B1 | | 5/2001 | Nagl et al. |
| 6,236,531 B1 | | 5/2001 | Allsup et al. |
| 6,271,987 B1 | | 8/2001 | Allsup et al. |
| 6,273,823 B1 | | 8/2001 | Rohs et al. |
| 6,341,051 B2 | * | 1/2002 | Hachiya et al. ............ 360/265.1 |
| 6,351,344 B1 | | 2/2002 | Krum et al. |
| 6,351,350 B1 | | 2/2002 | Symons et al. |
| 6,377,420 B1 | | 4/2002 | Tadepalli et al. |
| 6,407,879 B1 | | 6/2002 | Fruge' et al. |

(Continued)

FOREIGN PATENT DOCUMENTS

| | | |
|---|---|---|
| EP | 1615224 B1 | 9/2009 |
| JP | 62088195 A | 4/1987 |

(Continued)

*Primary Examiner* — Julie Anne Watko

(57) ABSTRACT

A disk drive includes a disk drive base, and a spindle. A disk is attached to the spindle, and the disk includes a disk outer peripheral extent. An actuator is attached to the disk drive base and defines an actuator pivot axis that is substantially parallel to the spindle rotation axis. At least one actuator arm extends away from the actuator pivot axis. A head gimbal assembly (HGA) is attached to the at least one actuator arm. A first disk limiter tab protrudes from a side of the actuator towards the spindle rotation axis. The disk drive also includes a ramp that has a parking surface that is in contact with the HGA with the disk drive in a non-operational state. The first disk limiter tab extends over the disk outer peripheral extent in the non-operational state.

15 Claims, 3 Drawing Sheets

(56) References Cited

U.S. PATENT DOCUMENTS

| | | |
|---|---|---|
| 6,417,986 B1 | 7/2002 | Tran et al. |
| 6,424,487 B2 | 7/2002 | Nagl et al. |
| 6,452,753 B1 | 9/2002 | Hiller et al. |
| 6,473,270 B1 | 10/2002 | McDonald et al. |
| 6,477,000 B1 | 11/2002 | Pottebaum et al. |
| 6,542,328 B2 | 4/2003 | Harrison et al. |
| 6,556,383 B2 * | 4/2003 | Murphy et al. ............ 360/244.9 |
| 6,624,966 B1 * | 9/2003 | Ou-Yang et al. ........... 360/97.15 |
| 6,724,566 B2 | 4/2004 | Kant et al. |
| 6,765,762 B2 | 7/2004 | Yanagihara |
| 6,781,791 B1 * | 8/2004 | Griffin et al. ................. 360/128 |
| 6,791,790 B2 | 9/2004 | Lee |
| 6,891,696 B1 | 5/2005 | Ou-Yang et al. |
| 6,894,867 B2 | 5/2005 | Hong et al. |
| 6,917,491 B2 | 7/2005 | Choi |
| 6,930,857 B1 * | 8/2005 | Lin et al. ................... 360/97.14 |
| 6,961,207 B2 | 11/2005 | Kang et al. |
| 7,057,849 B2 | 6/2006 | Soderfelt et al. |
| 7,085,098 B1 | 8/2006 | Yang et al. |
| 7,136,246 B2 | 11/2006 | Khanna et al. |
| 7,146,713 B1 | 12/2006 | Ying |
| 7,256,959 B2 | 8/2007 | Morioka |
| 7,274,537 B2 * | 9/2007 | Fan et al. ................... 360/265.7 |
| 7,307,811 B2 | 12/2007 | Xu et al. |
| 7,310,199 B2 | 12/2007 | Pottebaum et al. |
| 7,327,530 B2 | 2/2008 | Lee et al. |
| 7,372,662 B2 | 5/2008 | Xu et al. |
| 7,420,775 B2 | 9/2008 | Lim |
| 7,428,741 B2 | 9/2008 | Kim et al. |
| 7,457,078 B2 | 11/2008 | Fukaya et al. |
| 7,474,500 B2 | 1/2009 | Kim |
| 7,529,062 B2 | 5/2009 | Xu |
| 7,530,082 B2 | 5/2009 | Chang |
| 7,570,453 B2 | 8/2009 | Kim et al. |
| 7,602,586 B2 | 10/2009 | Kim et al. |
| 7,751,145 B1 | 7/2010 | Lin et al. |
| 7,839,602 B2 * | 11/2010 | Dunckley et al. .......... 360/99.08 |
| 7,961,426 B2 | 6/2011 | Naruse |
| 8,009,384 B1 | 8/2011 | Little |
| 8,089,733 B2 | 1/2012 | Ng et al. |
| 8,164,848 B2 | 4/2012 | Chan et al. |
| 8,194,346 B2 | 6/2012 | Kubo |
| 8,228,631 B1 | 7/2012 | Tsay et al. |
| 8,289,646 B1 | 10/2012 | Heo et al. |
| 8,446,688 B1 | 5/2013 | Quines et al. |
| 8,553,356 B1 | 10/2013 | Heo et al. |
| 2001/0012174 A1 | 8/2001 | Imamura |
| 2003/0151848 A1 | 8/2003 | Lee |
| 2004/0085676 A1 | 5/2004 | Aoishi et al. |
| 2005/0057854 A1 | 3/2005 | Khanna et al. |
| 2005/0190488 A1 | 9/2005 | Chan et al. |
| 2006/0005214 A1 | 1/2006 | Kim et al. |
| 2006/0176608 A1 | 8/2006 | Xu et al. |
| 2007/0081269 A1 | 4/2007 | Kim et al. |
| 2010/0177442 A1 | 7/2010 | Ng et al. |
| 2011/0255190 A1 * | 10/2011 | Lee et al. ................... 360/97.02 |
| 2011/0286131 A1 | 11/2011 | Teo et al. |

FOREIGN PATENT DOCUMENTS

| | | |
|---|---|---|
| JP | 06236670 A | 8/1994 |
| JP | 08297817 A | 11/1996 |
| JP | 2000149493 A | 5/2000 |
| JP | 2000268485 A | 9/2000 |
| JP | 2003249053 A | 9/2003 |
| JP | 2003331562 A | 11/2003 |
| WO | WO 2004081942 A1 | 9/2004 |
| WO | WO 2007115453 A1 | 10/2007 |

* cited by examiner

DISK DRIVE HAVING A HEAD LOADING RAMP AND A DISK LIMITER TAB THAT PROJECTS FROM A SIDE OF AN ACTUATOR ARM

BACKGROUND

The typical hard disk drive includes a head disk assembly (HDA) and a printed circuit board (PCB) attached to a disk drive base of the HDA. The head disk assembly includes at least one disk (such as a magnetic disk, magneto-optical disk, or optical disk), a spindle motor for rotating the disk, and a head stack assembly (HSA). The spindle motor typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor, for controlling the position of the HSA, and for providing a data transfer channel between the disk drive and its host.

The head stack assembly typically includes an actuator, at least one head gimbal assembly (HGA), and a flex cable assembly. Each HGA includes a head for reading and writing data from and to the disk. In magnetic recording applications, the head typically includes an air bearing slider and a magnetic transducer that comprises a writer and a read element. The magnetic transducer's writer may be of a longitudinal or perpendicular design, and the read element of the magnetic transducer may be inductive or magnetoresistive. In optical and magneto-optical recording applications, the head may include a mirror and an objective lens for focusing laser light on an adjacent disk surface.

During operation of the disk drive, the actuator must rotate to position the heads adjacent desired information tracks on the disk. The actuator includes a pivot bearing cartridge to facilitate such rotational positioning. One or more actuator arms extend from the actuator body. An actuator coil is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk drive is not in use.

Many modern HDAs include a ramp adjacent the disk outer periphery. In such HDAs, each HGA (itself attached to the distal end of an actuator arm in the HSA) typically includes a lift-tab. The lift-tab is designed to contact a lift-tab supporting surface of the ramp when the actuator moves near an extreme position that is typically beyond the disk outer periphery. To prevent the heads from sliding off of the outer edge of the disk before they are properly unloaded, a portion of the ramp (that includes a portion of the lift-tab supporting surface) typically must extend over the disk outer periphery. That portion of the ramp overlaps the disk in a region of the outer diameter that includes a head landing zone. The head landing zone typically does not include user data, because contact with the ramp and/or disk in the head landing zone typically prevents the head from reliably reading and writing data there.

Typically at the beginning of a period when the disk drive is not in use, the actuator rotates the HSA so that each HGA's lift-tab contacts a corresponding lift-tab supporting surface, in a lift-tab pick-up region of that lift-tab supporting surface, to unload the heads from the surface of the disk. Then the actuator continues to rotate so that each of the lift-tabs slides over the lift-tab supporting surface to a lift-tab parking region where it will remain while the disk drive is not in use. The position of the HSA when the lift-tabs are in the lift-tab parking region is referred to as the parked position of the HSA.

The benefits of unloading the heads can include improved tribological performance and reliability of the head-disk interface and improved robustness to mechanical shocks that are suffered under non-operating conditions. For example, unloading and parking the heads can improve robustness to mechanical shocks during periods of disk drive non-operation because, when unloaded and parked, the heads are not physically adjacent disk surfaces. Therefore, the heads are less likely to impact and thereby damage the disk surface in response to mechanical shocks when the HSA is in the parked position.

However, the disk(s) may still deflect significantly in response to mechanical shocks, although such deflection may be limited by contact between the disk(s) and the ramp, and/or other components such as the disk drive cover, and/or the disk drive base plate. Still, such limiting contact may be undesirable depending on the characteristics of the component being contacted by the disk. For example, the base plate may have features against which disk contact is undesirable and could cause disk surface damage and associated loss of user data.

Moreover, typical specifications for mechanical shock robustness in the disk drive industry are becoming more stringent, especially for disk drives designed for mobile applications. To meet such specifications the disk drive must be able to survive more severe mechanical shocks. More severe shocks may cause impact between one or more disks and a feature of the disk drive base and/or the disk drive cover for which contact is undesirable, despite the existence of a nominal clearance between the two. Furthermore, the nominal clearance may not be practically increased to the extent necessary to prevent such impacts because of dimensional constraints and/or operational considerations (e.g. desired damping of disk vibration from close proximity of a large region of the disk surface to an adjacent region of the disk cover and/or base plate.

Thus, there is a need in the art for a disk drive design having an improved structure for limiting disk deflection in response to mechanical shocks that may occur under non-operating conditions.

DETAILED DESCRIPTION

Figure 1:
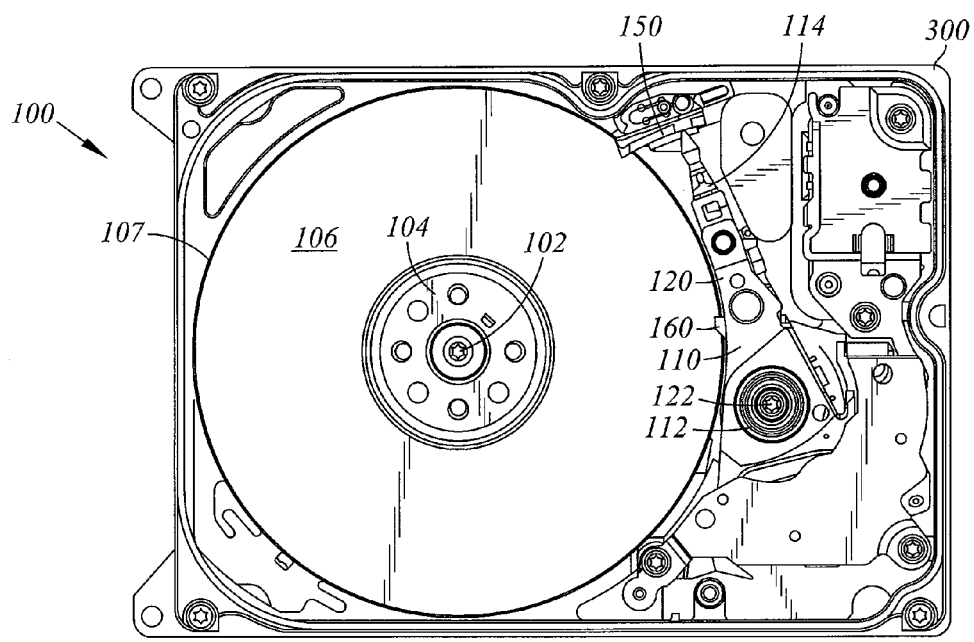
FIG. 1 is a top view of a disk drive according to an embodiment of the present invention.
Figure 2:
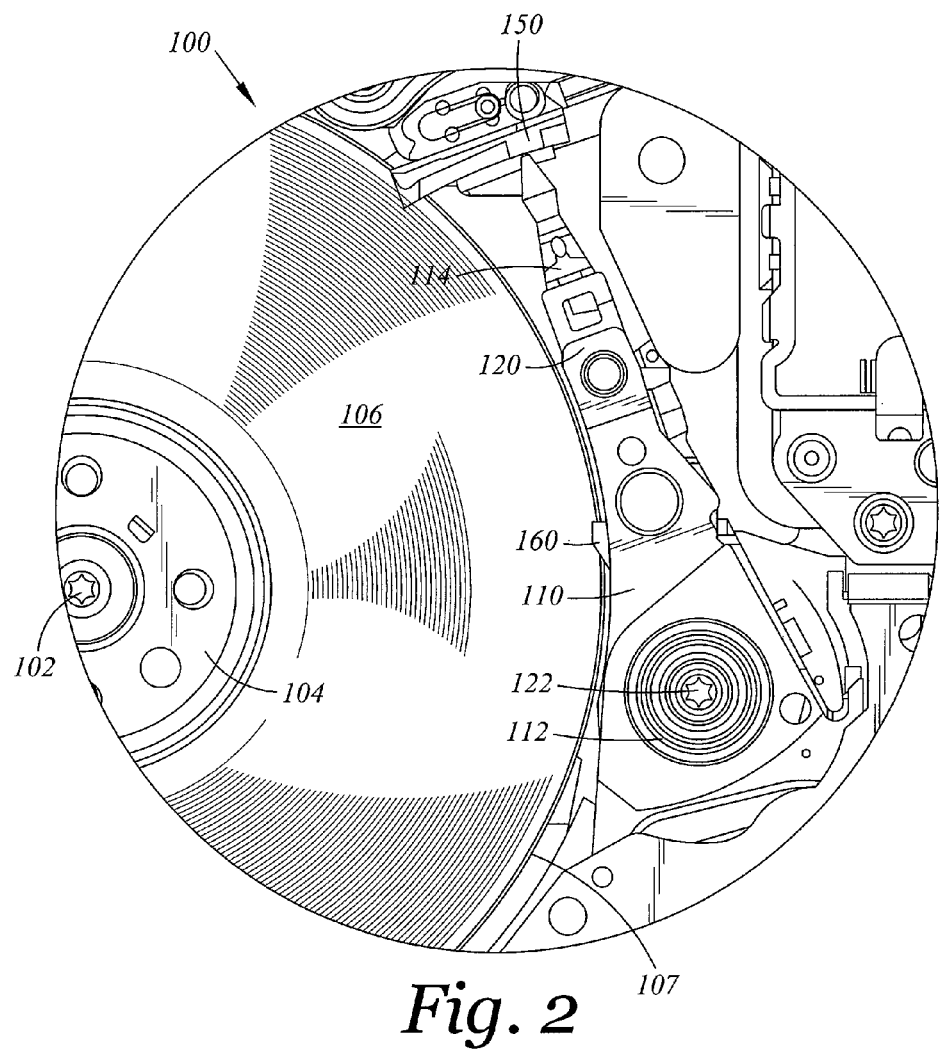
FIG. 2 is an enlarged top view of a portion of a disk drive according to an embodiment of the present invention.

FIG. 1 is a top view of a disk drive 100 according to an embodiment of the present invention. FIG. 2 is an enlarged top view of a portion of disk drive 100. The disk drive comprises a disk drive base 300 and a spindle 104 attached to the disk drive base 300. The spindle 104 defines a spindle axis of rotation 102 (normal to the page in FIG. 1). A disk 106 has a top surface and an opposing bottom surface and is mounted on spindle 104. In contemporary magnetic hard disk drive applications, the disk 106 may comprise an aluminum, glass, or ceramic substrate, with the substrate being coated with a NiP under-layer, a thin-film magnetic layer, a diamond-like amorphous carbon protective layer, and a very thin lubricant layer. The disk 106 defines a disk outer peripheral extent 107.

An actuator 110 is attached to the disk drive base 300. The actuator 110 is typically fabricated from aluminum, magnesium, beryllium, or stainless steel, and pivots about a pivot bearing 112 that is inserted as a cartridge into a bore in the actuator. The pivot bearing cartridge 112 is typically retained in the bore by a C-clip or tolerance ring but may be otherwise retained (e.g. by an adhesive). The actuator 110 defines an actuator pivot axis 122 at the location of the pivot bearing cartridge 112. The actuator pivot axis 122 is substantially parallel to the spindle rotation axis 102 (normal to the page in FIG. 1). At least one actuator arm 120 extends away from the actuator pivot axis 122.

In the embodiment of FIG. 1, a head gimbal assembly (HGA) 114 is attached to the actuator 110 and may support a read head near its distal end. The HGA 114 may also include a lift-tab (e.g. at its distal end) that is in contact with a parking surface of a ramp 150 with the disk drive 100 in a non-operational state. Specifically, at the beginning of a period of non-operation of the disk drive 100, the actuator 110 swings the HGA 114 away from the spindle 104 and beyond the outer peripheral extent 107 of disk 106. The lift-tab of the HGA 114 then contacts the ramp 150 to separate or "unload" the read head from the surface of the disk 106. After such unloading, the ramp 150 and its parking surface support the distal end of the HGA 114, rather than the disk 106 providing such support.

The ramp 150 optionally includes a HGA motion-limiting feature to protect the HGA 114 from damage during a mechanical shock event that might occur during periods of non-operation of the disk drive 100. Such a feature is designed to interfere with extreme motions of the head and/or suspension assembly while the lift-tab of the HGA 114 resides in the parking region of the ramp 150. For example, such a HGA motion limiting feature may prevent head-to-head contact between HGAs in response to mechanical shock and/or may reduce the risk of a vertical deflection of HGA 114 that might exceed its elastic range.

The ramp 150 may be fabricated from any suitable material having acceptable cost, dimensional stability, and tribological characteristics, and may be a material that can be injection molded. For example, the ramp 150 may comprise polyoxymethylene (POM), polycarbonate, a liquid crystal polymer (LCP), nylon, an acetal resin plastic or acetyl homopolymer, and/or polyetherimide, among other materials.

In the embodiment of FIG. 1, a disk limiter tab 160 protrudes from a side of the actuator 110 towards the spindle rotation axis 102. The disk limiter tab 160 extends over the disk outer peripheral extent 107 in the non-operational state. In this context, extending "over" refers to an overlap as viewed parallel with the actuator pivot axis 122 (i.e. the disk limiter tab 160 extends closer to the spindle rotation axis 102 than is the disk outer peripheral extent 107). For example, the disk limiter tab 160 may extend over the disk outer peripheral extent 107 by a radial overlap distance (measured radially with respect to the spindle axis of rotation 102) in the range 0.2 mm to 2 mm.

In certain embodiments, the actuator 110, the disk limiter tab 160, and the at least one actuator arm 120 are a single component with material continuity rather than being an assembly of subcomponents. However, alternatively the disk limiter tab 160 may be a distinct sub-component that is conventionally fastened or adhered to the actuator 110. In the embodiment of FIGS. 1-2, a face of the disk limiter tab 160 is preferably but not necessarily spaced, in a direction parallel to the actuator pivot axis 122, between 0.3 mm and 0.6 mm from a surface of the disk 106. In certain embodiments, the disk drive 100 is a 3.5 inch form factor disk drive and the disk limiter tab 160 is preferably but not necessarily disposed between 4 and 34 mm from the actuator pivot axis 122. In certain other embodiments, the disk drive 100 is a 2.5 inch form factor disk drive and the disk limiter tab 160 is disposed between 4 and 20 mm from the actuator pivot axis 122. In certain embodiments, the foregoing dimensions may advantageously enhance the robustness of hard disk drives to mechanical shocks that may occur under non-operating conditions.

Figure 3:
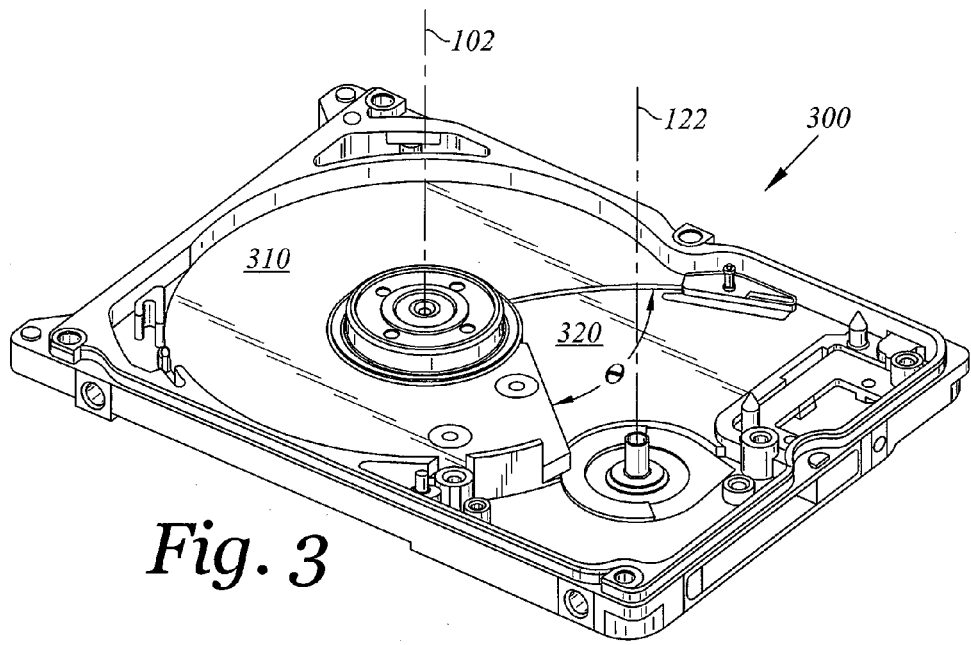
FIG. 3 is a perspective view of a disk drive base, capable of use in an embodiment of the present invention.

FIG. 3 is a perspective view of a disk drive base 300, capable of use in an embodiment of the present invention. Now referring additionally to FIG. 3, the disk drive base 300 includes a first base surface 310 that faces the disk (e.g. disk 106 of FIG. 1). The disk drive base 300 also includes a second base surface 320 that faces the disk but that is disposed further from the disk than is the first base surface 310. The disk limiter tab 160 may be disposed over the second base surface 320. In this context, being disposed "over" refers to a position as viewed parallel with the actuator pivot axis 122 (i.e. an imaginary line that is parallel with the actuator pivot axis 122, that intersects the disk limiter tab 160, would also intersect the second base surface 320).

In the embodiment of FIG. 3, the first base surface 310 spans at least 270 degrees about the spindle rotation axis 102, and the second base surface spans an angle θ about the spindle rotation axis 102 that is preferably but not necessarily between 50 degrees and 90 degrees. Preferably but not necessarily, the first base surface 310 is spaced (in a direction parallel to the actuator pivot axis 122) less than 0.6 mm from the disk surface, while the second base surface 320 is spaced (in a direction parallel to the actuator pivot axis 122) more than 0.6 mm from the disk surface. In certain embodiments, the foregoing dimensions may advantageously enhance the robustness of hard disk drives to mechanical shocks that may occur under non-operating conditions.

Figure 4:
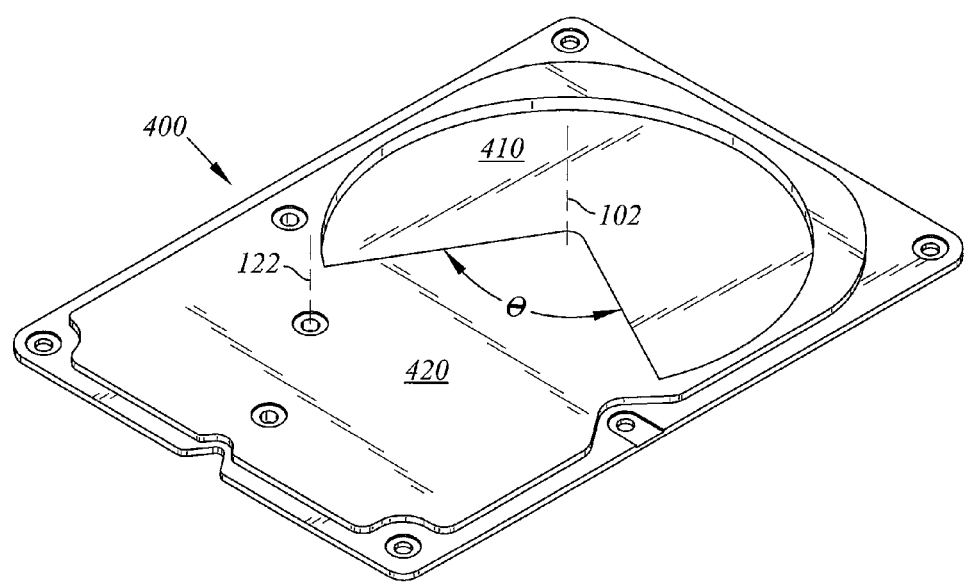
FIG. 4 is a perspective view of a disk drive top cover, capable of use in an embodiment of the present invention.

FIG. 4 is a top perspective view of a disk drive top cover 400, capable of use in an embodiment of the present invention. Now referring additionally to FIG. 4, the top cover 400 includes a first cover surface 410 (underside of the top cover 400 facing away from the viewer of FIG. 4 at the location marked by label 410) that faces the disk (e.g. disk 106 of FIG. 1). The top cover 400 also includes a second cover surface 420 (underside of the top cover 400 facing away from the viewer of FIG. 4 at the location marked by label 420) that faces the disk but that is disposed further from the disk than is the first cover surface 410. The disk limiter tab 160 may be disposed under the second cover surface 420. In this context, being disposed "under" refers to a position as viewed parallel with the actuator pivot axis 122 (i.e. an imaginary line that is parallel with the actuator pivot axis 122, that intersects the disk limiter tab 160, would also intersect the second cover surface 420).

In the embodiment of FIG. 4, the first cover surface 410 spans at least 270 degrees about the spindle rotation axis 102, and the second base surface spans an angle φ about the spindle rotation axis 102 that is preferably but not necessarily between 50 degrees and 90 degrees. Preferably but not necessarily, the first cover surface 410 is spaced (in a direction parallel to the actuator pivot axis 122) less than 1 mm from the disk surface, while the second cover surface 420 is spaced (in a direction parallel to the actuator pivot axis 122) more than 1 mm from the disk surface. In certain embodiments, the foregoing dimensions may advantageously enhance the robustness of hard disk drives to mechanical shocks that may occur under non-operating conditions.

In certain embodiments, the disk drive 100 of FIG. 1 may include a plurality of disks that are mounted on spindle 104. For example, disk 106 may be a bottom disk above which one or more additional disks (including a top disk) may be mounted on the spindle 104. Such a top disk and intermediate disks may be present in the view of FIG. 1, but they are kept transparent to avoid obscuring the view of the bottom disk 106. In the multi-disk case, the bottom disk 106 is adjacent the disk drive base 300 and includes a bottom surface that faces the disk drive base 300, while the top disk is adjacent the top cover 400 and includes a top surface that faces the top cover 400. In the multi-disk case, the actuator 110 may include the first disk limiter tab 160 that faces the top surface of the bottom disk 106 as shown in FIG. 1. In the multi-disk case, the actuator 110 may also include a second disk limiter tab that protrudes from the side of the actuator 110 towards the spindle rotation axis 102, and that extends over the outer peripheral extent of the top disk and faces the bottom surface of the top disk.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein, are intended to be read as open-ended terms.

We claim:

1. A disk drive comprising:
a disk drive base;
a spindle attached to the disk drive base and defining a spindle rotation axis;
a first disk for storing user data and attached to the spindle, the first disk including a disk outer peripheral extent;
an actuator attached to the disk drive base and defining an actuator pivot axis that is substantially parallel to the spindle rotation axis, the actuator including:
at least one actuator arm extending away from the actuator pivot axis; and
a first disk limiter tab protruding from a side of the actuator towards the spindle rotation axis;
wherein the disk drive further comprises:
a head gimbal assembly (HGA) attached to the at least one actuator arm; and
a ramp comprising a parking surface that is in contact with the HGA with the disk drive in a non-operational state, wherein in the non-operational state, the first disk limiter tab extends over the first disk from the disk outer peripheral extent toward the spindle rotation axis by only a radial overlap distance in the range of 0.2 mm to 2 mm.

2. The disk drive of claim 1 wherein the disk drive base includes a first base surface that faces the first disk, and a second base surface that also faces the first disk but that is disposed further from the first disk than is the first base surface, and wherein the first disk limiter tab is disposed over the second base surface.

3. The disk drive of claim 2 wherein the first base surface spans at least 270 degrees about the spindle rotation axis, and the second base surface spans between 50 degrees and 90 degrees about the spindle rotation axis.

4. The disk drive of claim 2 wherein the first base surface is spaced, in a direction parallel to the actuator pivot axis, less than 0.6 mm from a surface of the first disk.

5. The disk drive of claim 2 wherein the second base surface is spaced, in a direction parallel to the actuator pivot axis, more than 0.6 mm from a surface of the first disk.

6. The disk drive of claim 1 wherein the disk drive further comprises a top cover attached to the disk drive base, the top cover including a first cover surface that faces the first disk, and a second cover surface that also faces the first disk but that is disposed further from the first disk than is the first cover surface, and wherein the first disk limiter tab is disposed under the second cover surface.

7. The disk drive of claim 6 wherein the first cover surface spans at least 270 degrees about the spindle rotation axis, and the second cover surface spans between 50 degrees and 190 degrees about the spindle rotation axis.

8. The disk drive of claim 6 wherein the first cover surface is spaced, in a direction parallel to the actuator pivot axis, less than 1 mm from a surface of the first disk.

9. The disk drive of claim 6 wherein the second cover surface is spaced, in a direction parallel to the actuator pivot axis, more than 1 mm from a surface of the first disk.

10. The disk drive of claim 1 wherein the disk drive is a 3.5 inch form factor disk drive and the first disk limiter tab is disposed between 4 and 34 mm from the actuator pivot axis.

11. The disk drive of claim 1 wherein the disk drive is a 2.5 inch form factor disk drive and the first disk limiter tab is disposed between 4 and 20 mm from the actuator pivot axis.

12. The disk drive of claim 1 wherein a face of the first disk limiter tab is spaced, in a direction parallel to the actuator pivot axis, between 0.3 mm and 0.6 mm from a surface of the first disk.

13. The disk drive of claim 1 wherein the first disk limiter tab faces a first surface of the first disk, and wherein the actuator further comprises a second disk limiter tab that faces an opposing second surface of the first disk.

14. The disk drive of claim 1 further comprising a second disk attached to the spindle, and further comprising a top cover attached to the disk drive base, the first disk being adjacent the disk drive base and including a bottom surface that faces the disk drive base, the second disk being adjacent the top cover and including a top surface that faces the top cover, wherein the first disk limiter tab faces the bottom surface, and wherein the actuator further comprises a second disk limiter tab that faces the top surface and extends over the disk outer peripheral extent, and that protrudes from the side of the actuator towards the spindle rotation axis.

15. The disk drive of claim 1 wherein the actuator, the first disk limiter tab, and the at least one actuator arm are a single component with material continuity rather than being an assembly of subcomponents.

* * * * *